June 17, 1958  K. SCHLEGEL  2,838,939
ADJUSTING STROKE MECHANISM
Filed June 15, 1954  4 Sheets-Sheet 1
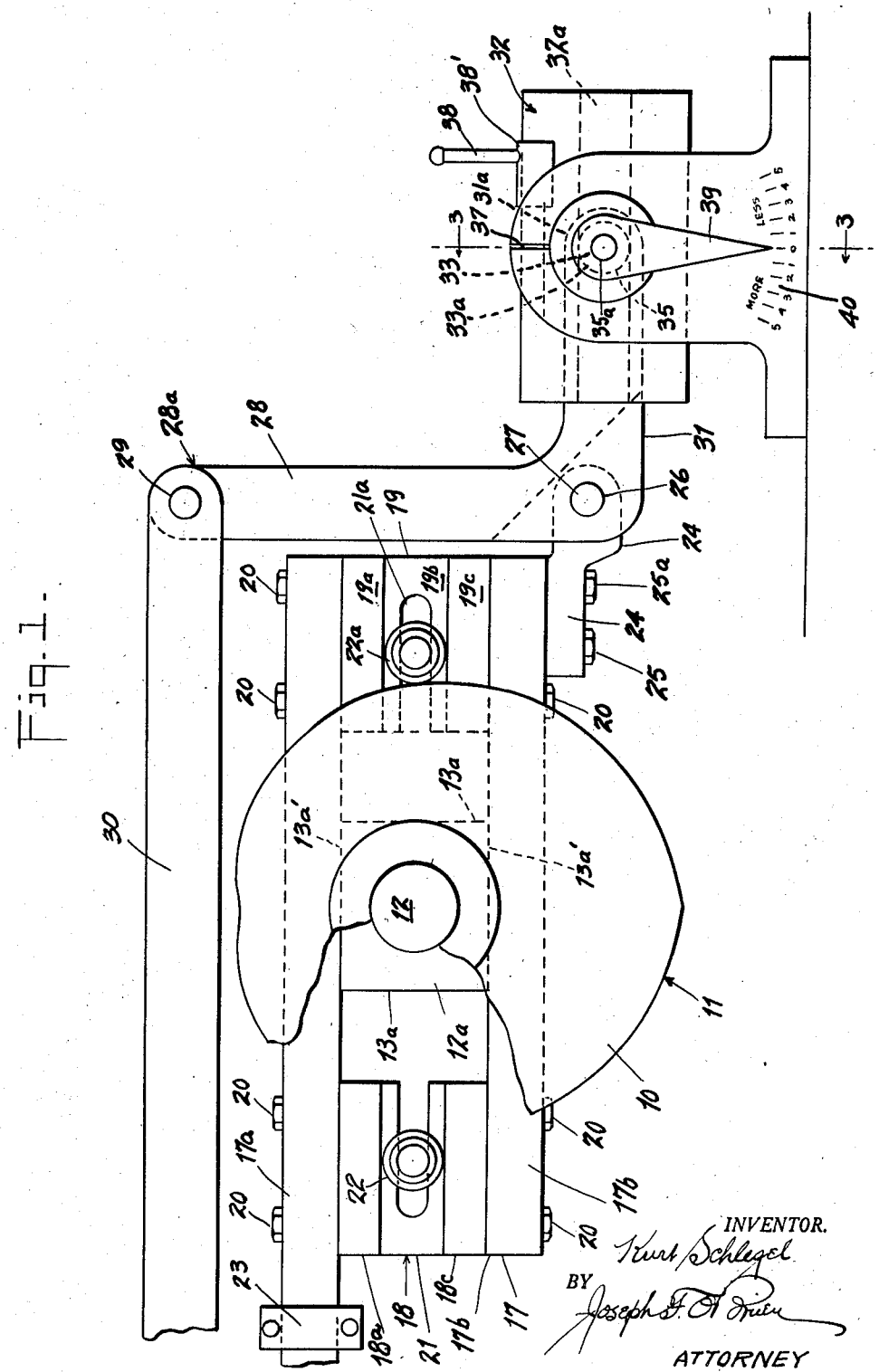
INVENTOR.
Kurt Schlegel
BY
Joseph F. O'Brien
ATTORNEY

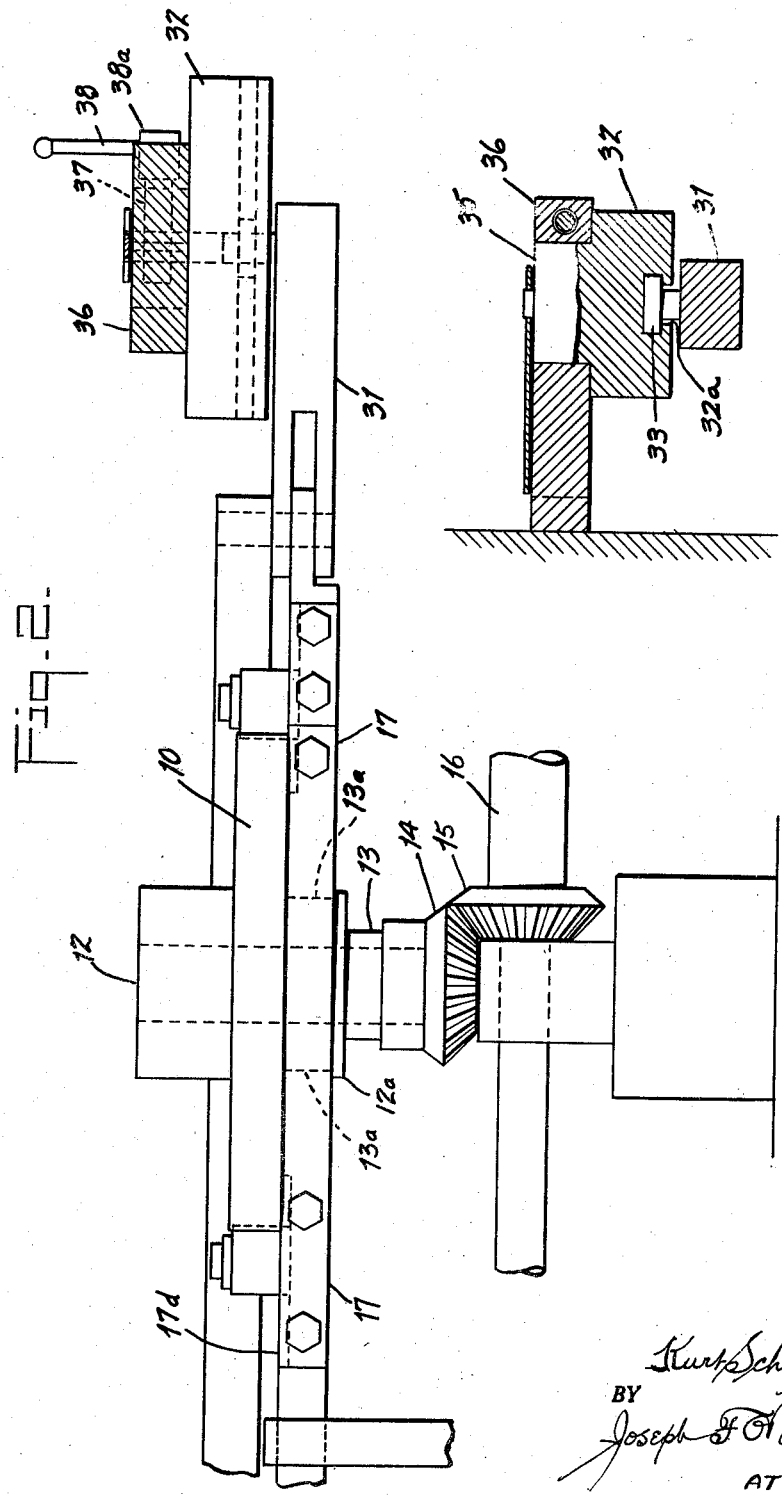

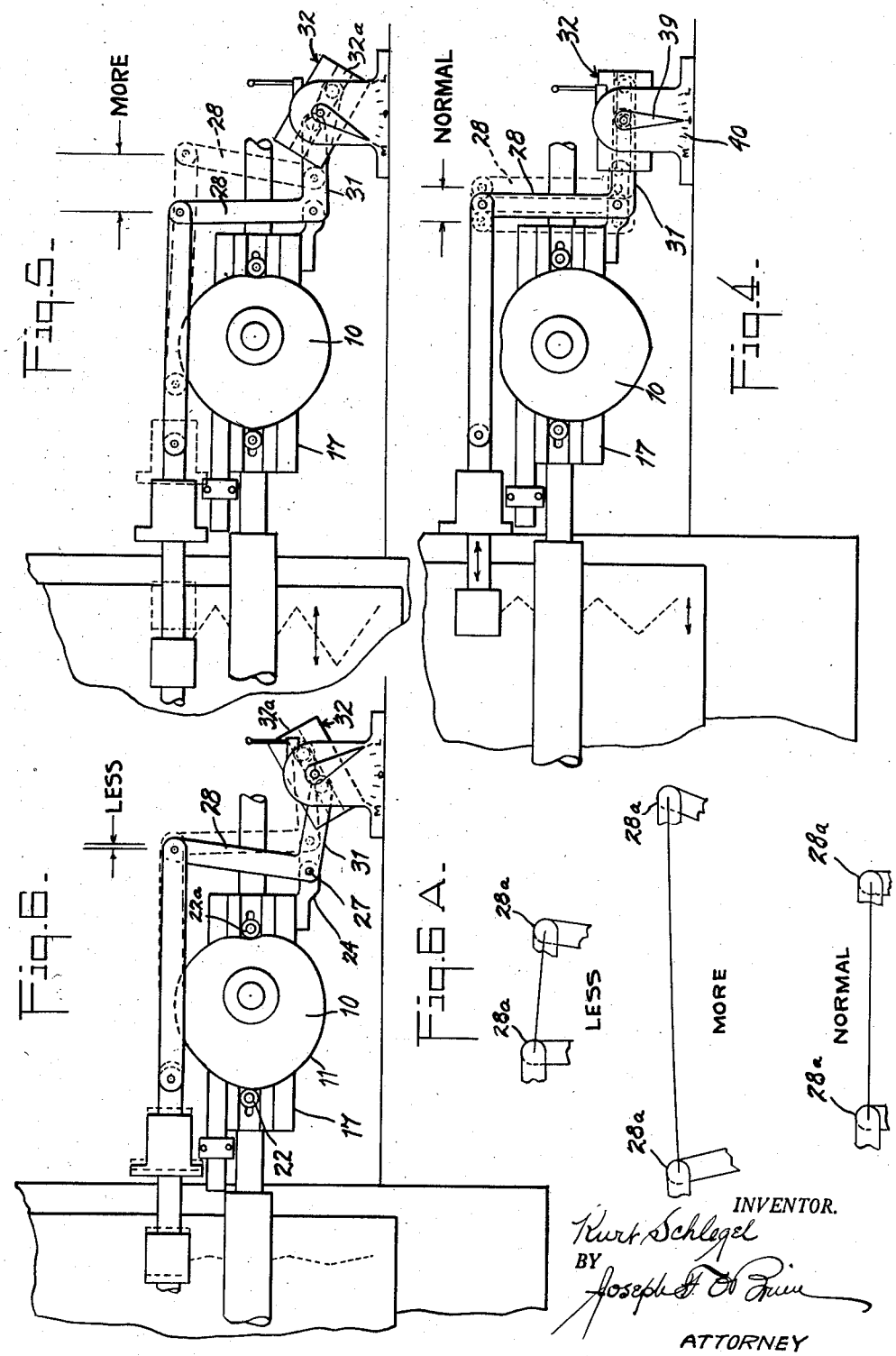

June 17, 1958  K. SCHLEGEL  2,838,939
ADJUSTING STROKE MECHANISM
Filed June 15, 1954  4 Sheets-Sheet 4
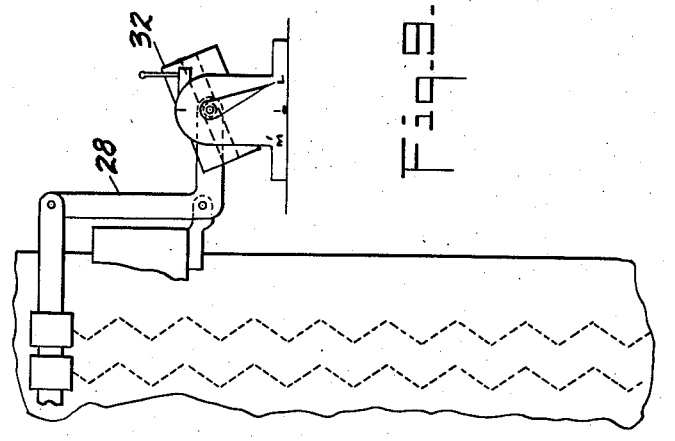
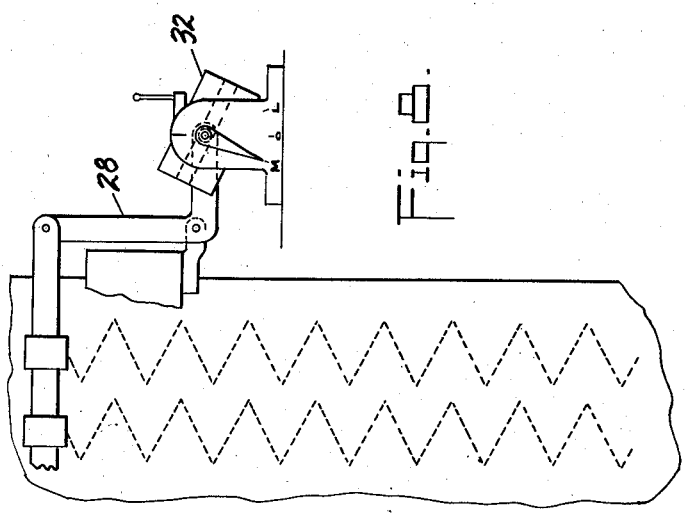
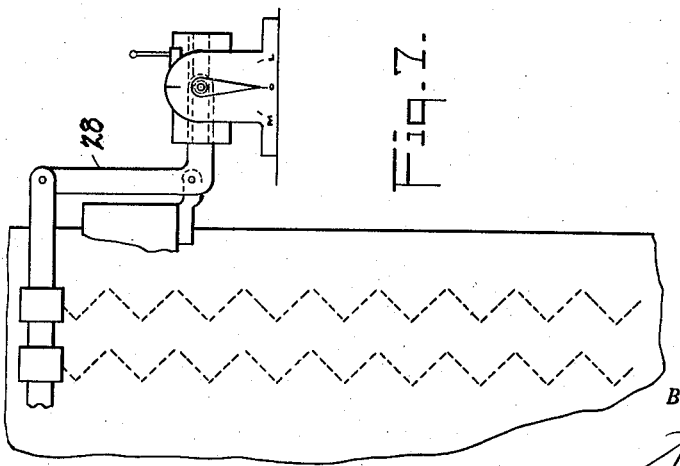
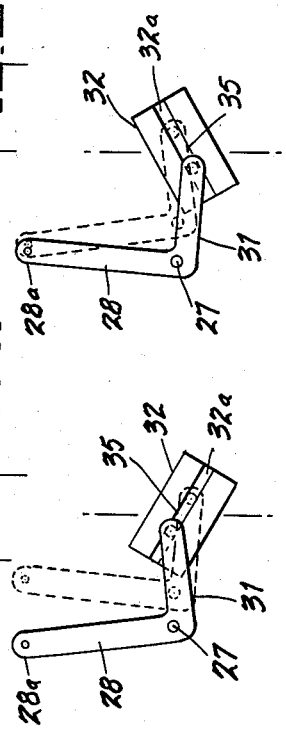
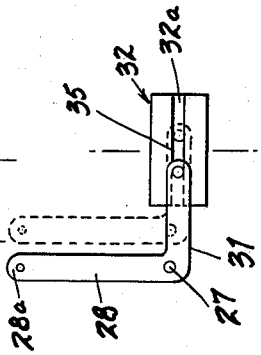
INVENTOR.
Kurt Schlegel
BY
Joseph F. O'Brien
ATTORNEY

United States Patent Office 2,838,939
Patented June 17, 1958

2,838,939
ADJUSTING STROKE MECHANISM
Kurt Schlegel, Mamaroneck, N. Y.

Application June 15, 1954, Serial No. 436,969

7 Claims. (Cl. 74—110)

This invention relates to improvements in adjusting mechanisms for varying the length of reciprocating movements of reciprocating members produced by cams or the like and which reciprocating movements are transmitted to stitching elements of quilt-stitching machines and to other machines that use such reciprocating movements.

I will hereinafter particularly describe my invention in relation to a cam-converted linear reciprocating motion though it will be understood that the reciprocating motion of the reciprocating member or carriage may be produced by any other suitable means.

Quilt-stitching machines and other devices use cams for converting rotary motion into a linear reciprocating movement, and when it is desired to change the throw of the cam for any purpose such as varying the width of the stitching design, it has heretofore been necessary to utilize a series of cams and to remove one cam and change to another in order to change or vary the length of the reciprocating motion.

One object of this invention is, in a quilt-stitching machine or other similar cam-actuating device, to provide a reciprocating member preferably comprising a carriage movable on stationary tracks and operated by a single cam preferably mounted to rotate about a fixed axis and by suitable arrangement of the cam and said reciprocating member to convert the rotary motion of the cam into a given reciprocating movement of the reciprocating member, which reciprocating movement will comprise the normal "throw" of said cam, and then prior to transmission of such movement to design-producing mechanism of a quilt-stitching machine or the like to adjust or modify said reciprocating movement or normal throw so as either to transmit said movement per se or to increase or reduce the transmitted reciprocating movement to provide many variations thereof and thus to enable production by such transmitted movement of a series of designs having varying widths.

Preferably I so adjust by utilizing adjusting means which is also adjustable to cause transmission of modifications of such rectilinear reciprocating movement by reducing or increasing the extent or length thereof, such modified movement when applied to a quilt or the like moving across the plane of the movement of the quilt and being adapted to cause the production of stitching designs of varying widths in accordance with such adjustment or modification.

More particularly, I utilize a carriage which has an initially converted reciprocating movement of said cam of such given length, in combination with a pivoted transmitting element having its pivot traversing said given linear line of reciprocating movement and its outer end connected with such stitching or design-producing mechanism together with a controlling member and means for adjusting the same in order (1) to maintain said transmission element against pivotal movement during movement thereof along said given linear line, or (2) causing a simultaneous pivotal movement during such linear movement and thus changing the length or extent of the transmitted reciprocating linear movements of said transmission element obtained from said cam-controlled carriage.

Another object of my invention is to provide, in combination with said controlling means, adjusting means comprising a pivoted track capable of (A) initially setting said controlling pivoted transmitting element either (1) in said position perpendicular to the said plane of converted movement and guiding the same to maintain said perpendicular position during movement thereof by said carriage and thus, as aforesaid, to reproduce exactly the reciprocating movement of the carriage, or (2) initially positioning such transmitting element (a) at an acute angle to said line of converted movement to cause the outer end of said transmitting element to extend to a starting position between the ends of said line of converted movement, or (b) to position said element at an obtuse angle to said line of converted movement and thus to cause the outer end of said transmitting element to assume a starting position beyond the starting end of said line of converted movement, and in both last-mentioned cases first adjusting the extent of movement of said outer end of the transmission element, and secondly controlling and guiding the adjusted movement of said transmitting element about its pivot simultaneously with movement of said pivoted end by said carriage along said line of converted movement. Thus I am enabled to change the extent of movement of said outer end in accordance with the degree of said adjustment, whereby said outer end will transmit reciprocating movements of greater or lesser extent or length and consequently when such movements are applied to stitching mechanisms, the width of designs produced by such stitching or like mechanism operated by said transmission element may be varied.

Preferably to so mount said adjustable track pivotally a short distance beyond the outer end of said controlling member and to cause said adjustable track to have a slidable engagement with such outer end of said controlling member to produce a movement of said outer end in straight lines but at varying angles to the line of said converted reciprocating movement.

Another object of my invention is to employ said track preferably being pivoted in alignment with said path of converted movement and of the movable pivot of the transmitting element which traverses the same and to use guiding track portions at opposite sides of said pivot, whereby the outer end of said controlling member may be suitably set and guided.

Another feature of my invention is to provide with a roller the outer end of my controlling member which is connected as aforesaid with a transmitting element and to utilize in combination with said rollered outer end a pivoted track having grooved portions at opposite sides of its pivot and movable about said track pivot to positions in angular relationship to said linear line of movement by the reciprocating member of the conjoint pivot of the controlling member and transmitting element.

Mechanism is thus provided that will because of the fixed rectangular relationship of the controlling member with said transmitting element enable either a movement of the transmitting element in perpendicular relationship to the line of converted movement or will change and set the initial angularity of said transmitting element to said perpendicular position to one side or the other thereof and thereafter regulate the simultaneous pivotal movement thereof to cause the length of the transmitted reciprocating movements of such outer end of said transmission member to be varied in accordance with such setting and guiding by the track.

Still another object of my invention is, in combination with an adjustable track of the character specified, to provide a pointer fixed to the track for indicating on a suitable scale arranged in fixed position the degree of angular movement or adjustment of the track which may be correlated with other parts to show the extent of reciprocating movement transmitted by the outer end of the transmitting element to a design stitching mechanism.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of a cam-throw adjusting mechanism embodying my invention;

Fig. 2 is an end elevation partly in section of the cam-throw adjusting mechanism shown in Fig. 1;

Fig. 3 is a section on the line 3—3 of Fig. 1 looking in the direction of the arrows;

Fig. 4 is a view in plan of a cam-throw adjusting mechanism such as shown in Figs. 1 to 3 in which the normal throw of the cam (obtained by a mere converting of a rotary movement thereof into a given reciprocating movement) is transmitted to design stitching devices of a machine for stitching a quilt;

Fig. 5 is a view similar to Fig. 4 of cam-throw adjusting mechanism in which the throw of a cam is adjusted to apply to stitching mechanism for quilt or the like a greater than normal movement or throw;

Fig. 6 is a view of the cam-throw adjusting mechanism shown in Figs. 1 to 3 which is adapted to apply stitching mechanism for a quilt or the like a reciprocating movement of lesser throw than normal;

Fig. 6A is a diagrammatic view showing the lengths of the lines of reciprocating movements produced by adjustment of my cam-throw mechanism;

Figs. 7—7A, 8—8A and 9—9A are fragmentary views showing the reciprocating movement of my transmission element of my cam-throw adjusting mechanism applied to a quilt in a quilt-stitching machine and in each adjustment also illustrating the position of said transmission element, its control member and my grooved track for adjusting the position of said element.

Referring now to these drawings, which illustrate a preferred embodiment of my invention, 10 indicates a cam such as used in quilting machines and the like and having a peripheral cam surface 11. In accordance with the preferred form of my invention illustrated, the cam 10 is rotated by a shaft 12 mounted in fixed position, and, as shown in Fig. 2, is rotatable in a bearing 13 which is supported in any suitable manner. The shaft 12, as illustrated, is rotated in said bearing by a bevelled gear 14 which meshes with a gear 15 on a shaft 16 which is rotated from any suitable source of power not shown.

As illustrated more particularly in Figs. 1 and 2, the cam 10 abuts the upper surface $17^d$ of a carriage 17 which is mounted for ready reciprocating movement by a guiding lubricated contact with parallel side surfaces $13^{a'}$ of a fixed guide block $13^a$ supported by the bearing 13. Said carriage 17 carries contact rollers for engaging the peripheral cam surface of the cam 10 to produce such reciprocating movement of the carriage 17.

As shown, said carriage has a flat upper surface along which the cam slidably moves during its rotation and said carriage comprises spaced elongated outer bars $17^a$—$17^b$, the inner side surfaces of which slidably contact with said block $13^a$ and intermediate end blocks 18—19 which, as shown, are each composed of three pieces $18^a$—$18^b$ and $18^c$ and $19^a$—$19^b$ and $19^c$. The end blocks 18 and 19 are, as shown, connected to the outer elongated members $17^a$ and $17^b$ by bolts 20 and said carriage provides a flat upper surface $17^b$ above which the cam 10 is rotatable. The contact rollers are mounted in the end members 18 and 19 which, as shown, are provided with oppositely disposed slots 21—$21^a$, in which slots are suitably mounted cam-contact rollers 22—$22^a$, which, as aforesaid, are adapted to engage the operative cam surface 11. The rollers 22—$22^a$ are fixed on the carriage 17 and the spaced elongated members 17, $17^a$ of the carriage are, as above indicated, supported for reciprocating movement on the bearing plate $12^a$ and one end of said carriage is guided in such reciprocating movement by the provision of strap 23.

Obviously when the cam 10 is mounted to rotate about the shaft 12, the surface 11 of the cam 10 upon such rotation will engage the rollers and cause the carriage to move forwardly and rearwardly in accordance with the throw of the cam surface 11. The carriage 17 will thus have a given linear reciprocating movement in proportion to the throw 11 of the cam 10, and in accordance with my invention this exact given linear reciprocating movement (which I shall call the normal throw of the cam) and also additional linear reciprocating movements of greater and lesser lengths or extent and which function as cam-throws of additional length may be similarly transmitted to stitching or other machines that have heretofore required a plurality of cams for the purpose.

As illustrated, the carriage 17 is provided at one corner thereof with a fixed bearing elbow 24, which, as shown, is connected to the carriage by bolts 25—$25^a$. Said bearing elbow 24, as shown, projects outwardly a short distance from the carriage in the direction of movement thereof and is provided with a pivot-bearing 26 within which is mounted a pivot 27 on which is pivotally mounted one end of a motion transmitting element 28, which, as shown, extends in alignment with the outer end 19 of the carriage and has its outer end $28^a$ pivotally mounted at 29 to a transmitting rod 30, which in accordance with usual practice will extend to and be suitably connected with mechanism such as a stitching mechanism, which conventionally is operated by a cam-converted reciprocating movement and is used in a stitching machine or the like.

In the device illustrated, when the pivoted motion-transmitting element 28 is extended in perpendicular relationship to and maintained at right angles or perpendicular to the line of movement of the carriage during the reciprocating motion of the carriage so that any pivotal movement of the member 28 about its pivot is prevented, then said reciprocating carriage motion will be accurately and precisely transmitted to said element 28, and the outer end $28^a$ thereof will thereupon transmit such motion exactly through the pivot 29 and rod 30 to the stitching mechanism. On the other hand, if the transmitting element 28 is initially tilted on the pivot 26 in one direction or the other relatively to such perpendicular position and the movement of the transmitting element simultaneously about its pivot is properly adjusted, the outer end of said element may be caused to move in a longer or shorter reciprocating path relatively to the normal length of the reciprocating movement of the carriage, and in accordance with my invention I have provided means whereby the movement transmitted by such outer end $28^a$ through the transmission rod 30 to the stitching means may be reduced or lengthened in accordance with the initially-set position of the transmitting element $28^a$ in relation to said rectilinear normal line of carriage movement.

In the preferred embodiment of my invention, I connect to said transmitting element 28 a controlling member or controlling arm 31, which, as shown, extends outwardly from said element and away from said carriage in a direction of initial movement thereof. Said controlling member 31 preferably is disposed in fixed position at right angles to said transmitting element 28 and the angular guided movement of said attached member 31 in one direction or the other will similarly cause the initial positioning of the transmitting element 28 and movement thereof by the carriage and also simultaneously about its pivot so that the outer end of the member 28 will be caused to move in paths of reciprocating movement of lesser or greater length or extent than the initial reciprocating path of movement hereinabove referred to as caused when the transmitting element 28 is arranged and maintained in perpendicular relationship with or at right angles to the line of movement of the pivoted end of said member produced by said carriage.

In the preferred embodiment of my invention shown I provide means for adjusting the initial position of the outer end 31ª of the arm 31 and by adjustment and guiding of the movement of such outer end of the controlling member, I am enabled to vary the lengths of movement of the outer end 28ª of the transmitting member 28 so as to cause the transmitted movement to be varied and to transmit any lengths of reciprocating movement desired within the limits of the device.

In the preferred embodiment of my invention I utilize for the positioning and control of the movement of the outer end 31ª of the controlling member an adjustable track mechanism 32, which, as shown, is provided with a track 32ª having a width suitable for engagement with the periphery 33ª of a roller 33 on the controlling member and the guiding thereof. As shown the roller 33ª is fixedly pivoted by the pivot 34 at the outer end of the controlling member 31, and said track mechanism 32 is independently and fixedly mounted at a position adjacent to the outer end of said controlling member 31, and, as illustrated, said track mechanism 32 is pivoted on a pivot 35 in registration with the line of movement of the pivot at the pivoted end of the transmitting element, and as illustrated said pivot is suitably mounted in suitably supported bearing member 35ª and said track 32 is pivotally movable about said pivot 35 and is adjustable about said pivot into the varying positions to enable transmission of the exact normal reciprocating movement produced through the carriage by said cam and also varying movements either longer or shorter than said normal movement.

In the preferred embodiment of my invention my adjustable track 32 is provided with means for securely fastening said track in any one of a multiplicity of pivotally-adjusted positions. With this end in view, the bearing member 36 for pivot 35 of the track 32 (see Figs. 1 and 2) is split and the two parts thereof are connected by a screw 37 which is turnable into tightened and loosened positions by a turning movement of the screw 37 accomplished by hand operated lever 38 connected to and projecting from a screw-controlling cylinder 38ª which is fastened to the screw 37 and upon rotary movement moves the bearing parts to tighten or release the track on the pivot 35. Manually-operable screw-actuated means is thus provided for fastening and loosening the track on its pivot to enable movement and operation thereof in varying positions, and thus to produce securely-positioned means for guiding the controlling member in movements which control the throw-adjusting movement of the transmission element.

In the preferred embodiment of my invention illustrated, I provide a pointer 39, pivoted on a reduced extension 35ª of the track pivot 35 for indicating on a suitable scale 40 arranged in fixed position the degree of angular movement or adjustment of the track 32 which may be correlated with other parts to show the exact extent of reciprocating movement transmitted by the outer end 28ª of the transmitting element 28 to a design-stitching mechanism.

Having described my invention, I claim:

1. An adjusting mechanism for varying the length of reciprocating movements of a reciprocating member, said member having a portion movable in a straight line path of reciprocating movement of given length, a movement-transmitting means connected with and movable by a portion of said reciprocating member and comprising a lever pivoted intermediate its ends to provide dual arms arranged in fixed relationship to each other, one of said arms being initially positioned at one side of said pivot in perpendicular relationship to said line of reciprocating movement and comprising a movement-transmitting arm and the other arm being disposed at the opposite side of said pivot and comprising an adjusting arm, and a pivoted adjusting means engaging said adjusting arm for guiding movement of said adjusting and movement-transmitting arms to cause said initially positioned transmitting arm to be maintained during such transmitting movement in positions perpendicular to said straight line path of reciprocating movement or to be moved into angular relationship thereto whereby said element may be used to transmit to design-producing mechanism a reciprocating movement comprising an exact reproduction in length of said straight line path of reciprocating movement or a variation in such length, said adjusting means being provided with indications showing the initial perpendicular positioning of said movement-transmitting arm and the extent of angular movement thereof away from said initial perpendicular position.

2. An adjusting mechanism for varying the length of reciprocating movements of a reciprocating member, said member having a portion movable in a straight line path of reciprocating movement of given length, a movement-transmitting element pivotally connected with said linearly-movable portion and provided with a movement-transmitting portion movable thereby along said straight-line path of reciprocating movement, and adjusting means for initially positioning said movement-transmitting portion of said pivoted transmitting element either in perpendicular relationship to or at an angle to said straight-line path and thereafter guiding the same in such reciprocating movement of said pivoted end by said linearly-movable portion to cause said transmitting element either to be moved and maintained in positions perpendicular to said line of converted movement of said converting means whereby the outer end of said element may be used to transmit to design-producing mechanism a reciprocating movement comprising an exact reproduction in length of said reciprocating movement, or to cause said transmitting element during linear movement of said pivot thereof in a straight line to be moved about said pivot simultaneously with such linear movement and thus to vary the length of transmitting movement of the outer end of said transmitting element.

3. An adjusting mechanism for varying the length of reciprocating movements of a reciprocating member, said member having a portion movable in a straight line path of reciprocating movement of given length and connected with a movement-transmitting element as claimed in claim 2 in which a controlling member is fixedly connected with said transmitting element having a transmitting portion extending at a right angle therefrom, and said adjustable means is engageable with said controlling member to control the pivotal movement thereof and thereby to control the pivotal movement of the connected transmission element and to cause the outer end of a movement-transmitting portion of said transmitting element to move in paths of varying lengths during movement of said transmitting element by said reciprocating member.

4. An adjusting mechanism for varying the length of reciprocating movements of a reciprocating member, said member having a portion movable in a straight line path of reciprocating movement of given length as claimed in claim 2 in which a controlling portion of the movement-transmitting element is fixedly connected adjacent to said pivot with said transmitting element and extends at a right angle to the movement-transmitting portion of said transmitting element, and said adjustable means comprises a track pivoted in the path of movement of said controlling member and being adjustable about its pivot to cause said controlling member to move either in registry with said converted line of movement or in lines inclined thereto and extending from one side to the other thereof, and said track is engageable with said controlling member to control the pivotal movement thereof and thereby to control the pivotal movement of the transmitting element and to cause the outer end of said transmitting element to move in paths of varying lengths during movement of said transmitting element by the reciprocating member.

5. An adjusting mechanism for varying the length of reciprocating movements of a reciprocating member, said member having a portion movable in a straight line path of reciprocating movement of given length as claimed in claim 2 in which a controlling portion of the movement-transmitting element is fixedly connected adjacent to said pivot with said transmitting element and extends at a right angle to the movement-transmitting portion of said transmitting element, and adjustable means is provided which comprises a pivoted track which is adjustable about its pivot and is disposed in registration with the line of movement of the pivot of said transmitting element, said track having an anti-friction connection with said controlling member to cause movement of the end of said controlling member either in registration with said path or in lines inclined and extending from one side to the other thereof, and thus to control the pivotal movement of the transmitting element and to cause the outer end thereof to move in paths of varying lengths during movement of said element by the reciprocating member.

6. An adjusting mechanism for varying the length of reciprocating movements of a reciprocating member, said member having a portion movable in a straight line path of reciprocating movement of given length as claimed in claim 2 in which the adjusting means embodies a controlling portion of said transmitting element which is connected thereto adjacent to said pivot to extend at a right angle from the movement-transmitting portion thereof and an adjustable track is provided which is pivoted in registration with the line of movement of said controlling member and has an anti-friction connection therewith to cause movement of the end of said controlling member either in registration with said path or in lines inclined thereto and extending from one side to the other thereof and which track controls the pivotal movement of said controlling member and thereby controls the pivotal movement of the transmitting element and to cause the outer end of said transmitting element to move in paths of varying lengths during movement of said transmitting element by the reciprocating member and means is provided for positively fastening said pivoted track in its varying pivotal positions.

7. An adjusting mechanism for varying the length of reciprocating movements of a reciprocating member, said member having a portion movable in a straight line path of reciprocating movement of given length as claimed in claim 2 in which the adjusting means embodies a controlling portion of said transmitting element which is connected thereto adjacent to said pivot to extend at a right angle from the movement-transmitting portion thereof, and an adjustable track is provided which is pivoted in registration with the line of movement of said controlling member and has an anti-friction connection therewith to cause movement of the end of said controlling portion either in registration with said path or in lines inclined thereto and extending from one side to the other thereof and which track controls the pivotal movement of said controlling member and thereby controls the pivotal movement of the transmitting element and to cause the outer end of said transmitting element to move in paths of varying lengths during movement of said transmitting element by the reciprocating member, means is provided for positively fastening said pivoted track in its varying pivotal positions, said adjustable track also being provided with a pointer fixed to the track for indicating on a suitable scale arranged in fixed position the degree of angular movement or adjustment of the track which may be correlated with other parts to show the extent of reciprocating movement adapted to be transmitted by the outer end of the transmitting element.

References Cited in the file of this patent
UNITED STATES PATENTS

| 651,828 | Copland | June 19, 1900 |
| 767,481 | Hogan | Aug. 16, 1904 |
| 2,027,104 | Kahr | Jan. 7, 1936 |
| 2,119,567 | Williams | June 7, 1938 |

FOREIGN PATENTS

| 688,478 | Great Britain | Mar. 11, 1953 |